(12) United States Patent
Weller et al.

(10) Patent No.: US 12,229,143 B2
(45) Date of Patent: Feb. 18, 2025

(54) QUERY REFACTORING FRAMEWORK

(71) Applicant: SAP SE, Walldorf (DE)

(72) Inventors: Joerg Weller, Wieblingen (DE); Helmut Holthoff, Heidelberg (DE); Dimitrij Raev, Biebesheim am Rhein (DE); Julian Frank, Muehlhausen (DE); Hari Venkatesh Subramanian, Wiesloch (DE)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 17/870,888

(22) Filed: Jul. 22, 2022

(65) Prior Publication Data

US 2024/0028594 A1    Jan. 25, 2024

(51) Int. Cl.
*G06F 16/22* (2019.01)
*G06F 16/2455* (2019.01)

(52) U.S. Cl.
CPC ...... *G06F 16/2456* (2019.01); *G06F 16/2272* (2019.01)

(58) Field of Classification Search
CPC ............ G06F 16/2456; G06F 16/2272; G06F 16/245; G06F 6/2455; G06F 16/278; G06F 16/242; G06F 16/243; G06F 16/2445; G06F 16/2452; G06F 16/248
See application file for complete search history.

(56) References Cited

U.S. PATENT DOCUMENTS

| | | | |
|---|---|---|---|
| 11,567,965 B2 * | 1/2023 | Liao | G06F 16/2456 |
| 2014/0032525 A1 * | 1/2014 | Merriman | G06F 16/24556 |
| | | | 707/713 |
| 2015/0363113 A1 * | 12/2015 | Rahman | G06F 9/4881 |
| | | | 711/170 |
| 2018/0004804 A1 * | 1/2018 | Merriman | G06F 16/9535 |
| 2023/0350867 A1 * | 11/2023 | Noll | G06F 16/24564 |
| 2023/0359620 A1 * | 11/2023 | Teflioudi | G06F 9/5044 |

OTHER PUBLICATIONS

Angiulli et al. "An approximate algorithm for top-k closest pairs join query in large high dimensional data" ICAR-CNR Instituto di Calcolo e Reti ad Alte Prestazioni, Consiglio Nazionale delle Ricerche 87030 Rende, CS, Italy Aug. 16, 2004 (Year: 2004).*

* cited by examiner

*Primary Examiner* — Ajay M Bhatia
*Assistant Examiner* — Berhanu Mitiku
(74) *Attorney, Agent, or Firm* — Klarquist Sparkman, LLP

(57) ABSTRACT

Techniques and solutions are provided for improving query execution. Data models can be complex, which is often reflected in queries against such data models. The present disclosure provides a query refactoring technique where a complex query, such as a query expressed as a single select statement, can be formulated as a series of less complex queries. The workload of a database can be reduced by combining results of the less complex queries outside of the database. The present disclosure provides a framework for implementing these techniques, where the framework includes a virtual cube, a calculation engine, and one or more operations, which can all be implemented as classes in a programming language, and where a generic class or interface can help guide users in developing subclasses that provide a reformulation or refactoring of a complex query.

20 Claims, 9 Drawing Sheets

QUERY REFACTORING FRAMEWORK

FIELD

The present disclosure generally relates to query execution. Particular examples provide a query execution framework that facilitates executing complex queries using a collection of simpler queries.

BACKGROUND

Databases can be used to store vast amounts of data. The manner in which this data is stored can be exceedingly complex. That is, for example, lower-level objects or data artifacts (referred to for remainder of the present disclosure as "data artifacts" for ease of presentation), such as tables, can be referenced by one or more higher-level data artifacts, such as views. In turn, a given view can refer to multiple other views. Often, data artifacts, whether in a physical data model or a virtual data model, will have "view stacks," which are hierarchically arranged sets of views, where higher-level views build upon lower-level views.

Data artifacts in a virtual data model can be easier to work with for users than working directly with physical database artifacts. For example, a virtual data model can be expressed in a less technical format, and can include semantic information that makes elements of the virtual data model, including those corresponding to elements of a physical data model, more understandable to users. Data artifacts in a virtual data model can also be used to perform operations that might not be performable in the database. These aspects of a virtual data model, while giving them beneficial qualities, can result in data artifacts in a virtual data model being even more complex than physical database data artifacts.

Because of the above-described features, it can be comparatively easy to create data artifacts that are based on complex data relationships and calculations that provide much information of interest to users. However, the complexity can result in database queries that either are not processable, or which are processable but have execution times that are undesirable for users. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for improving query execution. Data models can be complex, which is often reflected in queries against such data models. The present disclosure provides a query refactoring technique where a complex query, such as a query expressed as a single select statement, can be formulated as a series of less complex queries. The workload of a database can be reduced by combining results of the less complex queries outside of the database. The present disclosure provides a framework for implementing these techniques, where the framework includes a virtual cube, a calculation engine, and one or more operations, which can all be implemented as classes in a programming language, and where a generic class or interface can help guide users in developing subclasses that provide a reformulation or refactoring of a complex query.

In one aspect, the present disclosure provides a method for executing a query by joining data retrieved from a database with data previously retrieved from the database, or derived therefrom, and stored in a data structure external from the database. A query request is received. A first operation of a set of a plurality of operations is executed. The execution of the first operation includes retrieving a first set of data from a database and storing at least a portion of the first set of data in a data structure external from the database. A second operation of the set of a plurality of operations is executed. The execution of the second operation includes retrieving a second set of data from the database and joining at least a portion of the second set of data with at least a portion of the at least a portion of the first set of data in the data structure and storing at least a portion of the joined data in the data structure. Query execution results are returned that include at least a portion of the joined data in the data structure.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
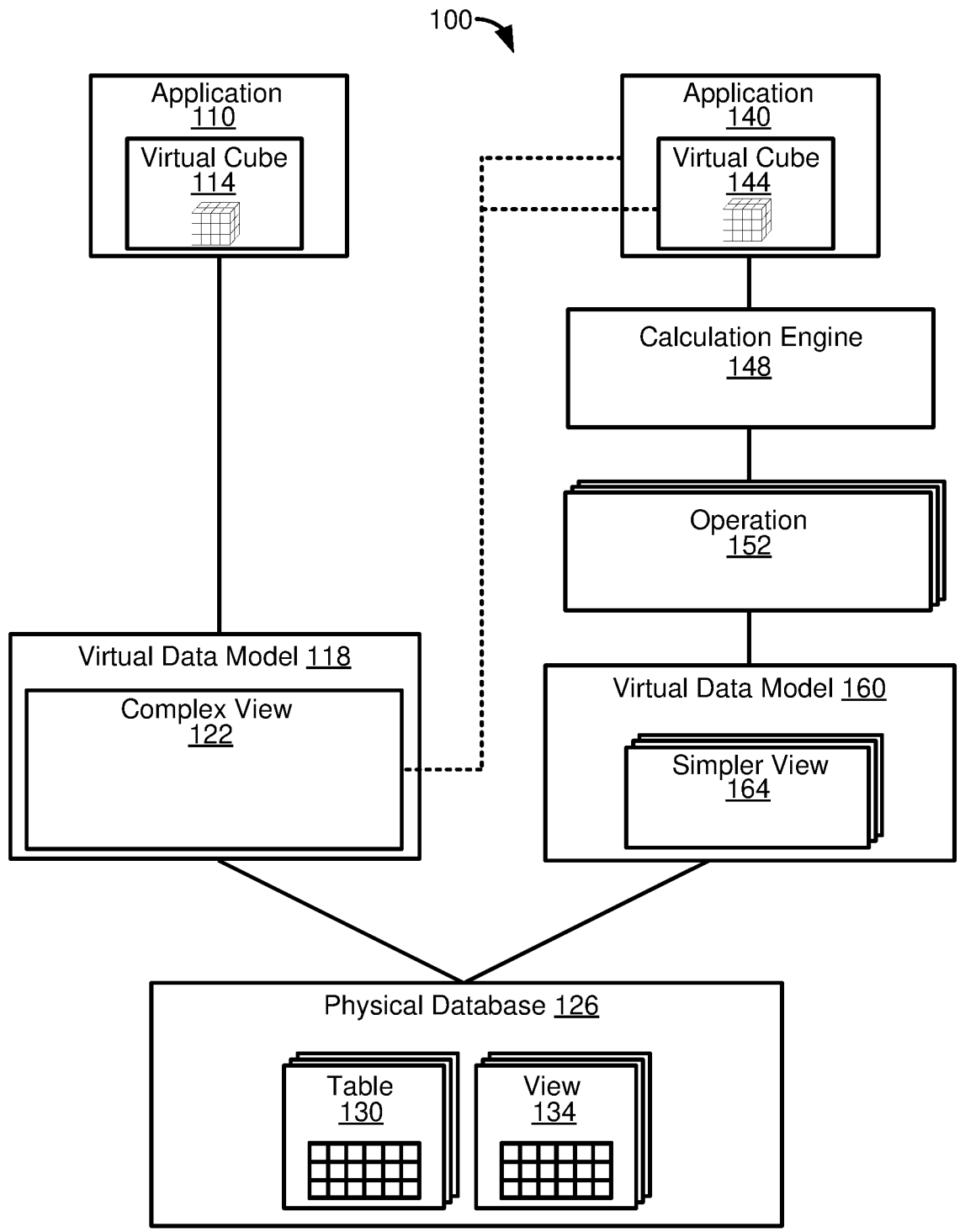
FIG. 1 is a diagram of a computing environment illustrating approaches for query execution using a complex data artifact or using a query refactoring framework using a plurality of less complex data artifacts.

Databases can be used to store vast amounts of data. The manner in which this data is stored can be exceedingly complex. That is, for example, lower-level objects or data artifacts (referred to for remainder of the present disclosure as "data artifacts" for ease of presentation), such as tables, can be referenced by one or more higher-level data artifacts, such as views. In turn, a given view can refer to multiple other views. Often, data artifacts, whether in a physical data model or a virtual data model, will have "view stacks," which are hierarchically arranged sets of views, where higher-level views build upon lower-level views.

Data artifacts in a virtual data model can be easier to work with for users than working directly with physical database artifacts. For example, a virtual data model can be expressed in a less technical format, and can include semantic information that makes elements of the virtual data model, including those corresponding to elements of a physical data model, more understandable to users. Data artifacts in a virtual data model can also be used to perform operations that might not be performable in the database. These aspects of a virtual data model, while giving them beneficial qualities, can result in data artifacts in a virtual data model being even more complex than physical database data artifacts.

Because of the above-described features, it can be comparatively easy to create data artifacts that are based on complex data relationships and calculations that provide much information of interest to users. However, the complexity can result in database queries that either are not processable, or which are processable but have execution times that are undesirable for users. Accordingly, room for improvement exists.

Data models and queries used for complex operations, such as in the operation of business enterprises, can be extraordinarily complex. The data models often contain hundreds, or even thousands of tables and views. A single table or view can in turn have many attributes, including data artifacts with hundreds of attributes.

Traditionally, database data is "normalized" using particular rules in order to help avoid data redundancy and improve data integrity. Rather than storing data in a single large table with many attributes, data is often broken into smaller tables, where two tables have a common attribute that can be used to combine data from the tables, such as using a JOIN operation. Views can be treated the same way.

Certain types of database architectures, including those that support column-formatted data instead of, or in addition to, row-formatted data are increasingly common. For column-formatted data, it is common for data to be denormalized as compared to how the data might be stored using traditional normalization rules for row-store data. However, even for data that has undergone some degree of denormalization, data models are typically still very complex, and queries can involve many data artifacts and many joins between the data artifacts.

The complexity of the data models and queries can create problems even for powerful database systems. Given all of the join operations and attributes, and the fact that many databases may have millions of rows for a particular data artifact, memory needed to conduct the joins can be extensive. Thus, a database system may run out of memory, or other computing resources, and fail to execute a query. Even if the query executes, the time needed to execute the query can be unacceptable to users.

The present disclosure provides techniques that can address these issues. Rather than using a single, complex data artifact as unitary set of query operations (for example, sending a single "SELECT" statement to the database), the present disclosure allows queries to be processed using a framework that instead executes the query as a series of operations on less complex data artifacts. The complex data artifact can still be a data artifact that is provided to users, as it can allow users to more easily formulate queries/ understand the nature of the underlying data, or a particular result provided using the data artifact. The data artifact can also affect how the results of a query are processed or made available, including providing authorization checks or providing details on how data associated with the data artifact is displayed. Not all users need to understand how the data artifact is actually processed/retrieves data—whether it is processed as the complex view or using a collection of less complex components that provides results that are the same as if the complex view was used directly.

Typically, a user defines the less-complex data artifacts that are used in place of the complex data artifact. However, the present disclosure provides a framework that can assist a user in constructing data artifacts for a particular use scenario, or for adjusting or creating other operational components to accomplish a particular task.

In particular, the disclosed framework includes three components: a virtual data artifact, a calculation engine, and one or more operations. The present disclosure discusses a particular implementation of disclosed technologies that provides a "virtual cube," where a "cube" refers to a "cube" as used in the field of Online Analytical Processing (OLAP). As is known, data in an OLAP cube can be processed as a multi-dimensional data structure, or can be processed by mapping a cube definition to a collection of two-dimensional data artifacts, such as in a star schema or a snowflake schema. Although the discussion proceeds with the specific example of a "virtual cube," it should be appreciated that the disclosed techniques can be used with other data artifacts (for example, a view in a virtual data model that defines a highly complex query, but is not necessarily a "cube") in an analogous manner.

The framework, the virtual cube, the calculation engine, and the operations, can be defined as software objects. An "object" can be an abstract data type, typically including defining a set of values (such as represented by variables or other data members) and a set of operations for the object, including operations to be performed using values defined for the object. Particular examples of "objects" include classes, including as implemented in programming languages such as C++, JAVA, and ABAP.

Object-oriented programming languages typically support concepts of inheritance and polymorphism, including the concept of interfaces. That is, somewhat "generic" high-level objects can include data members or member methods that are required to be implemented by "child" objects. In particular, the member methods of a parent class can include implementations that are fixed, and which cannot be altered by child classes, or can include implementations that can be overridden by child classes. However, the parent class can simply specify methods that must be included/implemented in child classes, without specifying any implementation at all, as is typical for interfaces.

For a virtual cube, a highest-level class will typically include methods to get/set properties for the cube, to define the cube, and to read data for the cube. The first/highest-level class that implements the interface can include implementations for the interface methods. These method implementations, in particular embodiments, are fixed/not changeable by child members. However, these methods can include other methods that are left for implementation by child classes. For example, methods to define a start and end for a cube definition, start and end for a read process, a method to get operations to be performed, and a method to call a calculation engine to call the operations can be left for implementation by a child/cube subclass. Child cube classes, which can be defined at multiple levels, can implement abstract methods of the parent cube class, and can add additional methods or data members.

Similarly, a calculation parent class that serves as an interface can define a method to execute operations. A highest-level class that implements the interface can include an implementation of the "execution operations" method that is required/unalterable by child classes. However, the calculation engine parent class can include abstract methods to be implemented by child classes that define how operations are determined and requested. As with the cube classes, calculation classes can include child classes at various levels, which can specify additional data members or methods.

As for the operations, an interface class can define an execute method. A highest-level class that implements the interface can include an implementation of the execute method that is not alterable by child classes, and can specify additional methods that are to be implemented by child classes, including to define the start and end of execution, and any methods that might be common between operations. In a particular example provided by the present disclosure, an operation retrieves data from a database. Typically, a first operation retrieves data and stores the data in a temporary, internal table (outside of the database). Subsequent operations retrieve additional data from the database and join such data with data in the internal table. Thus, an "operation" parent class that implements the interface can specify methods for obtaining data from the database.

For all of the class types discussed above, a virtual cube, a calculation engine, and an operation, various types of hierarchal relationships/class structures may be provided depending on a particular use case. For example, a single class may implement the interface. Or, a class that implements the interface may specify additional abstract methods that are to be implemented by its child classes, where such child classes provide final implementations of at least certain class methods. Or, that child class may specify further methods that are to be implemented by its child classes, or which can be overridden by its child classes.

This interface/class structure thus serves as guidance to users in how to perform queries that might otherwise be performed specifying a complex data artifact, instead specifying operations using a plurality of less-complex data artifacts, where the calculation engine and operations progressively integrate data from additional data artifacts specified in the complex view. The guidance is also progressive, in that relatively minor changes to a use case can be accommodated by relatively minor changes/additions to a class structure/implementation, while more major changes can involve more drastic changes (such as implementing a new subclass, or making changes to a higher-level class, such as a parent class that implements an interface).

Consider that an implementation of the framework described above has been created to replicate the functionality of a given complex data artifact. If an additional field is to be used in a particular calculation, it may only be necessary to change the operation logic for a single operation, implemented by a particular child class, in order to accommodate the change. If a completely different data artifact is to be processed using the framework, then it may be necessary to create child classes that implement methods specified by a parent class that implements the interface, or for more serious differences in use cases, to create a new parent class that implements the interface (along with any appropriate child classes).

One or more services can be provided to the framework. Example services can include a service to determine or sequence operations for a given request to be processed by the framework, a service to determine query conditions (for example, parsing user input or input through an API), a service to facilitate accessing data in a database, or a service to help manage results, including to help reduce memory usage. One technique to reduce memory management is to reduce attributes that are retrieved from a database, or to limit data that is stored in an internal table (outside of a database system from which data is initially retrieved). This can be particularly beneficial as only certain attributes may be needed for a query, but the underlying database artifacts can include many attributes, where even a single database artifact can have many hundreds of attributes. In some cases, a service, or a framework component, can analyze a data artifact, such as a data artifact in a virtual data model that is specified by a query, to determine elements specified in the data artifact. These elements can be used to create corresponding columns in the internal table, where only database data corresponding to such columns is stored in the internal table.

Another service, or functionality of a framework component, can perform actions on data retrieved from a database. For example, data used by an application, or processed through a virtual data model, often has different characteristics than data stored in a database. Databases often provide more limited options for typing or formatting data, or for semantically enriching data. A service or framework component can thus format, type, or enrich data from the database. In a particular example, database fields can be associated with elements of a virtual data model, where those elements include type, formatting, or semantic information. A service or framework component can use such a mapping to determine and apply appropriate operations to enrich data retrieved database data, including providing typed access to database data using a virtual data artifact that serves as a target for a query using the disclosed query refactoring framework.

Disclosed techniques can provide a number of benefits. As discussed above, one benefit is that, by implementing interfaces, polymorphism, and inheritance, code reuse is encouraged. If a use scenario is changed, or a new use scenario is to be created, changes can be made at a lowest level of a class hierarchy needed to accommodate a use scenario, or new subclasses can be created, while existing classes may continue to be used with the new subclass, or used with minor changes.

Having a defined framework can also assist users in developing or modifying use scenarios, as having a basic operational framework allows a user to "plug into" existing logic, rather than having to develop a process from the ground up. The operational framework also facilitates debugging, both by having a clear framework indicating how code is structured and by separating operational logic such that failure points can be more easily identified.

As has been discussed, disclosed techniques also can reduce the use of computing resources, make certain processes less time consuming for a computing system to perform, and even enable processes that would not otherwise be feasible. In addition to reducing the complexity of query operations, disclosed techniques can allow calculations to be performed outside of a database, which can spread a computing task over a wider range of computing resources, and at least in some cases have computing tasks performed in a more efficient environment.

Example 2—Example Query Refactoring Framework

FIG. 1 illustrates a computing environment 100 that compares a prior query approach with a query approach according to the present disclosure. In the prior query approach, an application 110 includes a virtual cube 114, which can be a programmatic object. The virtual cube 114 in turn references a complex view 122, such as a view in a virtual data model 118. The complex view 122 is "complex" in that it operates on data from multiple data artifacts in a physical database 126, such as tables 130 and views 134 as a unitary database process, such as a single "SELECT" statement. As compared with artifacts in the virtual data model 118, data artifacts in the physical database 126 directly store data (tables 130 or materialized views 134) or can be used to indirectly access data (such as using a non-materialized view 134, or data artifacts that obtain data through data federation) stored in data artifacts of the physical database that do directly store data.

More particularly, the complex view 122 typically contains/defines a large number of joins, including joins involving tables or views with many attributes (fields, columns), and often containing a large number of records. The complex view 122 can also specify calculations to be performed using data from the physical database 126. At least in some cases, the calculations specified in the complex view 122 can be "pushed down" to be performed in the physical database 126, which can further increase the processing load (both processor use and memory requirements) on the physical database.

An approach according to the present disclosure also involves an application, 140, that includes a virtual cube, 144, which can also be a programmatic object. However, the virtual cube 144 is used a part of a framework that also includes a calculation engine 148 and one or more operations 152. The operations 152 can access a plurality of simpler views 164 of a virtual data model 160. In turn, the simpler views 164 can access the views 134 and the tables 130 of the physical database 126. In a particular example, each operation 152 includes a maximum of one select statement, and in a more specific example each operation includes a single select statement and optionally specifies additional processing on the retrieved data or data retrieved by prior operations.

At least in some embodiments, the data artifacts of the physical database 126 accessed through the virtual cube 144 can be the same as those accessed using the virtual cube 114. That is, an overall goal of the techniques of the present disclosure can be to obtain results identical to those obtained using the virtual cube 114, but instead with greater efficiency, greater reliability, and increased speed through the use of the virtual cube 144. Although, as mentioned, disclosed techniques can enable data processing that would not have been possible using the approach of the virtual cube 114 and the complex view 122.

Although the virtual data model 160 is not shown as including the complex view 122, the complex view can be included in the data model 160 in at least some implementations. That is, as discussed above, the complex view 122 can be a useful way of summarizing information to a user or process, and can specify additional operations for data retrieved using the less complex views 164. The complex view 122 can even be a view directly referenced by an end user or process, where the complex view includes an annotation indicating that data requests for the virtual cube 114 should be processed using the virtual cube 144/simpler views 164, but where the underlying data retrieval logic is otherwise hidden from the user—the user just gets the requested data; the user may not care how that data is functionally retrieved.

Example 3—Example Implementation of Query Refactoring Framework

Figure 2:
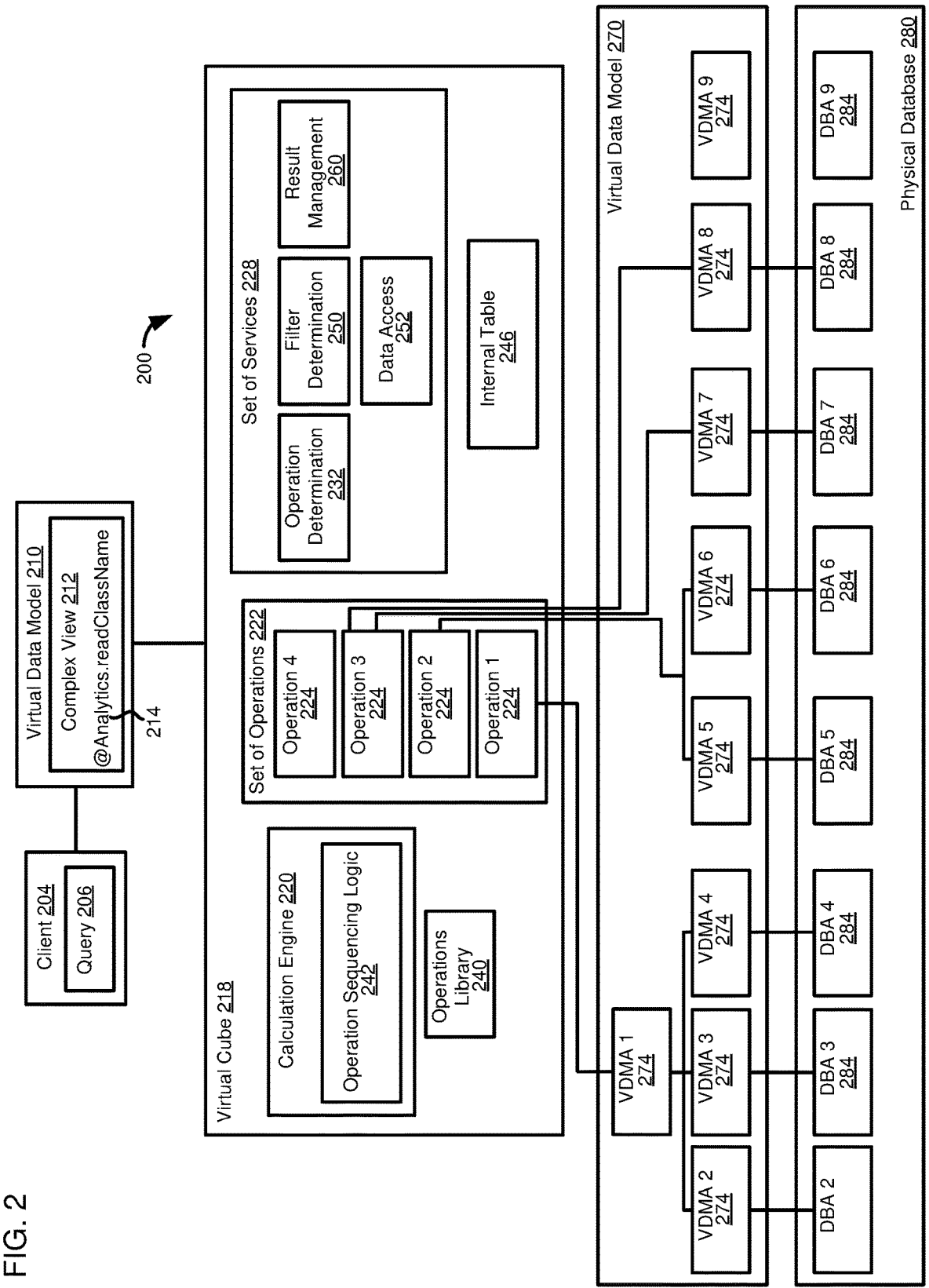
FIG. 2 is a diagram of a computing environment illustrating an example implementation of a query refactoring framework.

FIG. 2 illustrates a computing environment 200 that provides further details about how the virtual cube framework of FIG. 1 can be implemented. A client 204, such as a user or user computing process, submits a query 206. In a particular implementation, the query 206 references a complex view 212 of a virtual data model 210. However, unlike prior techniques, the computing environment 200 includes an annotation 214 to the complex view 212 that indicates that the query 206 should be executed using the execution framework of the present disclosure. In particular, the annotation specifies the name of a particular virtual cube class that is to be used for query execution.

Executing the query 206 using the complex view 212 and the annotation 214 calls a constructor of the virtual cube class indicated by the annotation. An instance 218 of the virtual cube class is created which, for convenience of presentation, is shown as including other framework components, including a calculation engine 220, a set 222 of operations 224, and a set of services 228.

A call to the virtual cube 218 can initially call the calculation engine 220. In turn, the calculation engine 220 can call an operation determination service 232 of the set of services 228. In a specific example, the operation determination service 232 can analyze properties of the query 206 to determine what operations should be executed in responding to the query. For example, a query can provide a user with options to view data at various levels of aggregation, such as aggregating data by month or year-to-date. A default behavior of the virtual cube 218 may be to retrieve and process unaggregated data, or data aggregated by month. An operation 224 can perform year to date aggregation. Thus, if the operation determination service 232 determines that year to date aggregation has been specified, the operation determination service can indicate to the calculation engine 220 that the year-to-date aggregation operation 224 should be executed.

The virtual cube 218 can optionally be associated with an operations library 240. The operations library 240 can be accessed by the calculation engine 220 or the operation determination service 232 in determining operations 224 of the set of operations 222 to be used in executing the query 206. The operations library 240 can represent a set of operations that are specified for the virtual cube 218. As will be further discussed, in a particular implementation of disclosed techniques, an operation class (which can be a subclass of a parent class, or a class that implements an interface) can specify the identity of a virtual cube with which it is associated. In addition, the calculation engine 220 can be provided with the identity of a general "operations" class specified for the virtual cube 218, or subclasses representing individual operations. More particularly, an "operations" class specified for the virtual cube 218 can include a "get operations" method. Or, the calculation engine 220 can be programmed to include a list of operations specified for the calculation engine of the virtual cube 218 (where other virtual cubes can optionally specify other calculation engines/operations).

After determining what operations are to be executed in responding to the query 206, the calculation engine 220 can execute operation sequencing logic 242. In some cases, operations may have a defined order, and any operations that are not needed for the query 206 can simply be omitted for the ordering. In other cases, the presence or absence of particular operations can have a more complex effect on operation sequencing, in which case more detailed logic can be implemented for determining an operation sequence. In particular, conditional logic, such as using IF THEN statements, or SWITCH statements, can be used for operation sequencing logic.

As has been explained, in at least some cases multiple operations, which can include all operations, include a data selection and optionally additional processing operations. An initial operation 224 can select data from a database and populate results to an internal table 246. Optionally after performing operations on the data in the internal table 246, a subsequently sequenced operation 224 can retrieve additional data from the database, join the data with the internal table, and optionally perform additional processing on the internal table 246 before performing further operations or returning a response to the query 206. As a particular example, one data operation can retrieve data from the database, a later operation can retrieve information used for data aggregation (such as period definitions) from the database, and the data aggregation information can be used to aggregate at least a portion of the data in the internal table 246.

Data access operations can be implemented using parameters specified for the query 206, which can be extracted using a filter determination service 250. The filter determination service 250 can then provide extracted query parameters for retrieving data from the database. Filter conditions can include components of a WHERE clause (such in SQL), but can optionally include other query components, such as selecting attributes to be retrieved (such as defining elements of a SELECT clause/a projection of views/tables in the database, or in a view of a virtual data model that references data artifacts of the database). Filter conditions (or, more generally, operations specified for a particular query 206) can be provided to a data access service 252.

In some cases, rather than having operations directly include instructions for retrieving data, data requests for the database can be carried out using the data access service 252. Among other things, having a specific service for extracting query conditions and then having another service to retrieve data from a database using the extracted conditions can eliminate the need to separately code database access requests into individual operations/a particular implementation of a virtual cube. These services can also make a virtual cube implementation easier to debug, and provides code separation/encapsulation. For instance, if protocols used to access a database change, the implementation of the data access service 252 can be updated, but it may not be necessary to change the code of the virtual cube 218, the calculation engine 220, or the operations 224.

In a particular example, the data access service 252 can execute queries in the form of:

select (iv_projection)
  from (iv_from)
  where (iv_where)
  group by (iv_group_by)
  %_hints hdb @iv_db_hints
  appending corresponding fields of table @cube_result→*.

The code above can represent APAB code, using the HANA database software available from SAP SE of Walldorf, Germany. The various "iv" arguments represent query parameters extracted by the filter determination service 250. The "appending" code illustrates how query execution results can be added to an internal table (in this case "cube_result").

Results of data retrieval operations can be managed by a result management service 260. The result management service 260 can be responsible for clearing the internal table 246 after query execution has completed, as well as managing data that is placed in the table. For example, the result management service 260 can optionally analyze the parameters of the query 206, either directly or using the parameters as extracted by the filter determination service 250. In particular, the result management service 260 can remove/exclude attributes that are not needed for query results. That is, a first data retrieval operation may not "know" what attributes are needed by other query operations, and so may retrieve all attributes from the relevant data artifacts of the database. The result management service 260 can prepare a list of attributes needed for query execution considering all query operations. If an attribute is not needed for the query, the result management service 260 can remove these results from the internal table 246, prevent writing of the results to the internal table to begin with, or can optionally modify queries submitted to the database, such as adding selection conditions/projections to query operations that would otherwise be specified for the data access service 252.

FIG. 2 also illustrates a virtual data model 270, having a plurality of virtual data model artifacts (VDMAs) 274 (such as views, or entity types, which can correspond to tables, and in some cases can be a simple view of the virtual data model that references a single table of a physical database), and a physical database 280, having a plurality of physical database artifacts (DBAs) 284 (such as tables or views). As shown, an individual operation 224 references one or more virtual data model artifacts 274, which can reference one or more additional virtual data model artifacts, where at least one virtual data model artifact for a given operation (typically at a lowest level of a view stack/hierarchy) references one or more data artifacts 284 of the physical database 280.

Example 4—Example Query Execution Using Query Refactoring Framework

Figure 3:
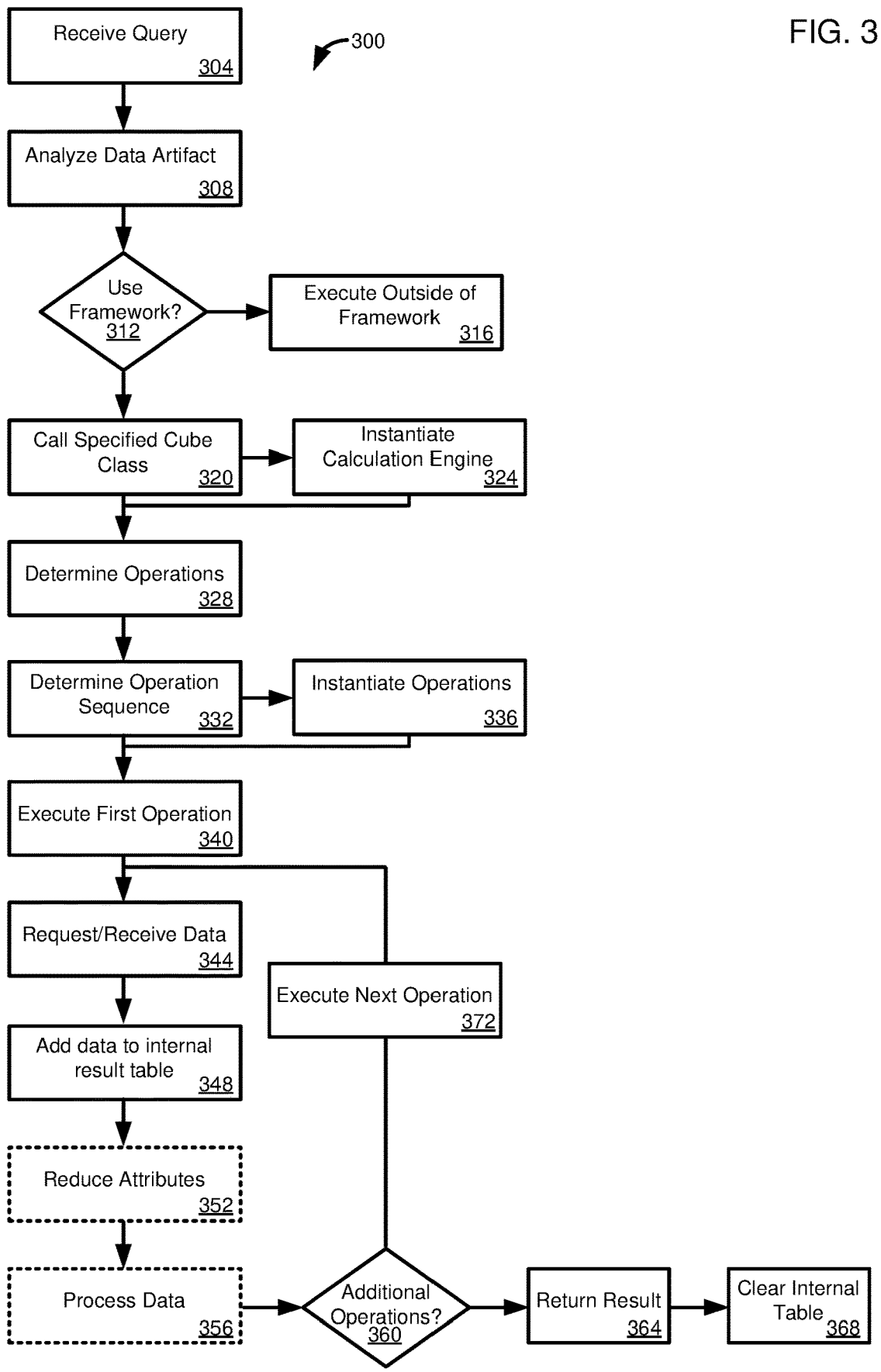
FIG. 3 is a flowchart of an example method of executing a query using a query refactoring framework.

FIG. 3 is a flowchart of a method 300 illustrating the operation of a particular example of the disclosed techniques. The method 300 can be implemented in the computing environment 200 of FIG. 2. A query is received at 304. The query specifies a particular data artifact, such as a complex view of a virtual data model. The data artifact is analyzed at 308. At 312, it is determined whether the query should be executed using a framework according to the present disclosure, such as by determining whether the data artifact includes an annotation specifying the use of a particular virtual cube according to the present disclosure. If not, the query is executed outside of the framework at 316.

If it is determined at 312 that the data artifact is to be executed using the framework, a virtual cube class specified in the data artifact can be called/instantiated at 320. Instantiating the virtual cube class at 320 also results in the instantiation of a calculation engine class instance at 324. Operations needed to execute the query are determined at 328, such as by the calculation engine calling an operation determination service. A sequence for the determined operation is determined at 332, such as using logic included in the calculation engine. The operations are instantiated (e.g., as class instances) at 336. Although the operations are shown as being instantiated at 336, in some cases, operations can be instantiated at different times, such as instantiating a second operation after the completion (or during the execution of) a first operation.

A first operation is executed at 340. As has been described, at least in some implementations, an operation includes a selection of data from a database and optionally additional processing operations to be performed on such data. First data is requested and received at 344. At least a portion of the data is added to an internal table at 348. In at least some embodiments, the internal table is located outside of a database from which the first data is retrieved. Optionally, at 352, data in the internal table is reduced, such as by removing attributes that have been determined not to be needed for the query. Alternatively, unneeded data can be filtered before the requested data is added to the internal table, or a request for the first data can be formulated to exclude data not required for the query.

Data retrieved from the database is optionally processed at 356. Processing at 356 can include calculating values based at least in part on retrieved data, and optionally storing such values in the internal table. For operations beyond a first operation, the processing at 356 can including performing a JOIN operation between data newly retrieved from the database and data in the internal table. As another example, newly retrieved database data can be used in defining aggregation conditions, and the processing at 356 can include aggregating data in the internal table based on the aggregation conditions.

At 360, it is determined if any additional operations remain to be executed in processing the query. If not, the method 300 proceeds to 364, where a query result is returned. The internal table is cleared at 368 to reduce memory usage. If additional operations are indicated at 360, the next operation is executed at 372, and the method 300 then returns to 344.

Example 5—Example Interfaces and Classes for Query Refactoring Framework

Figure 4:
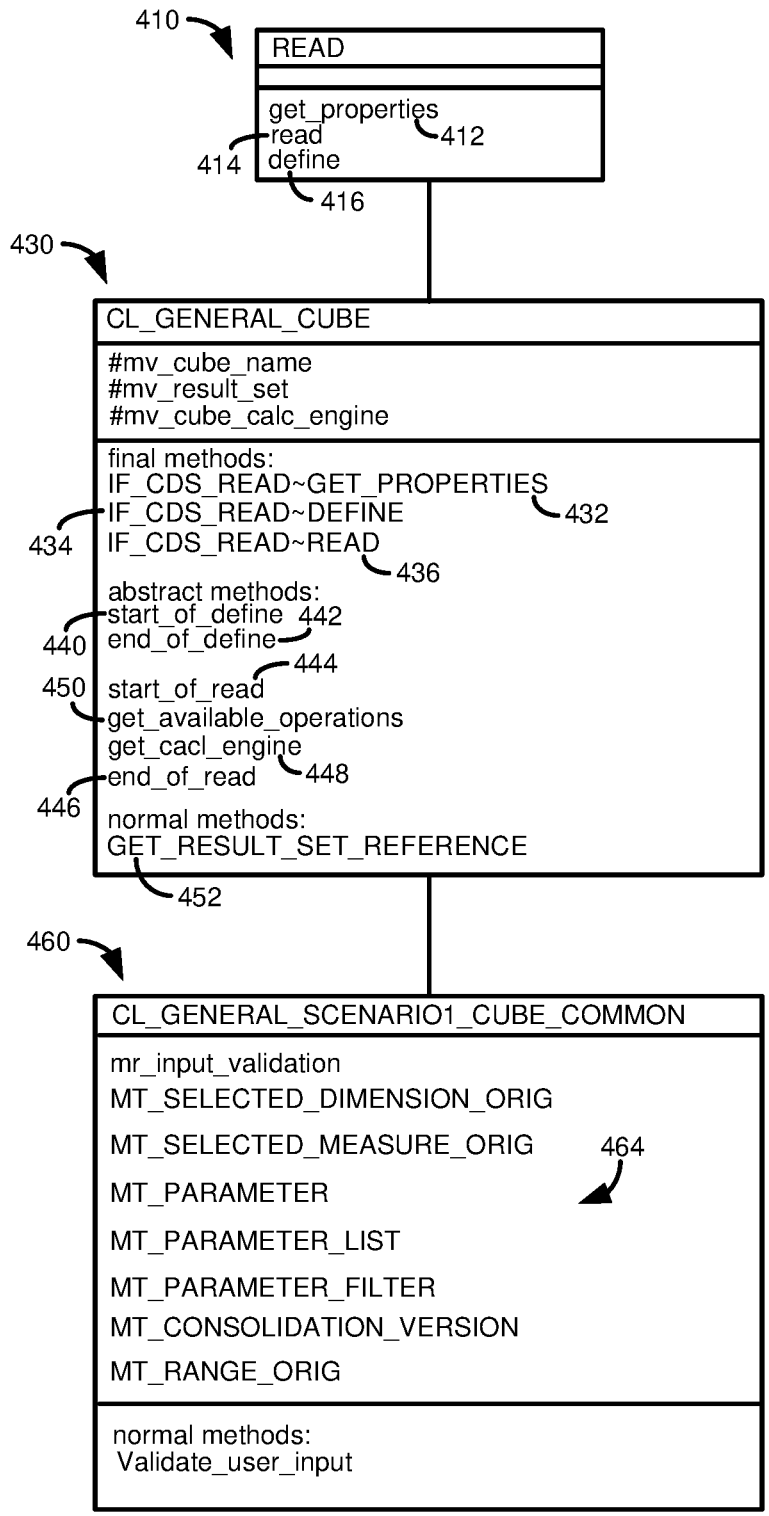
FIGS. 4-6 illustrate example interface and class definitions for components of a query refactoring framework.
Figure 5:
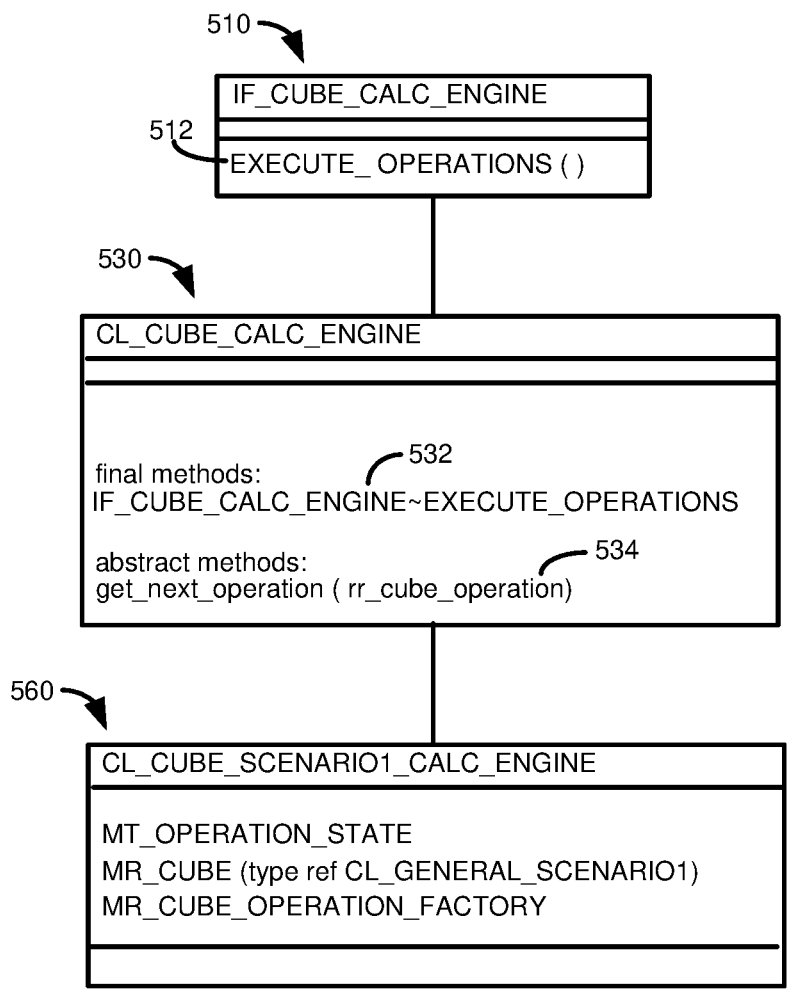
Figure 6:
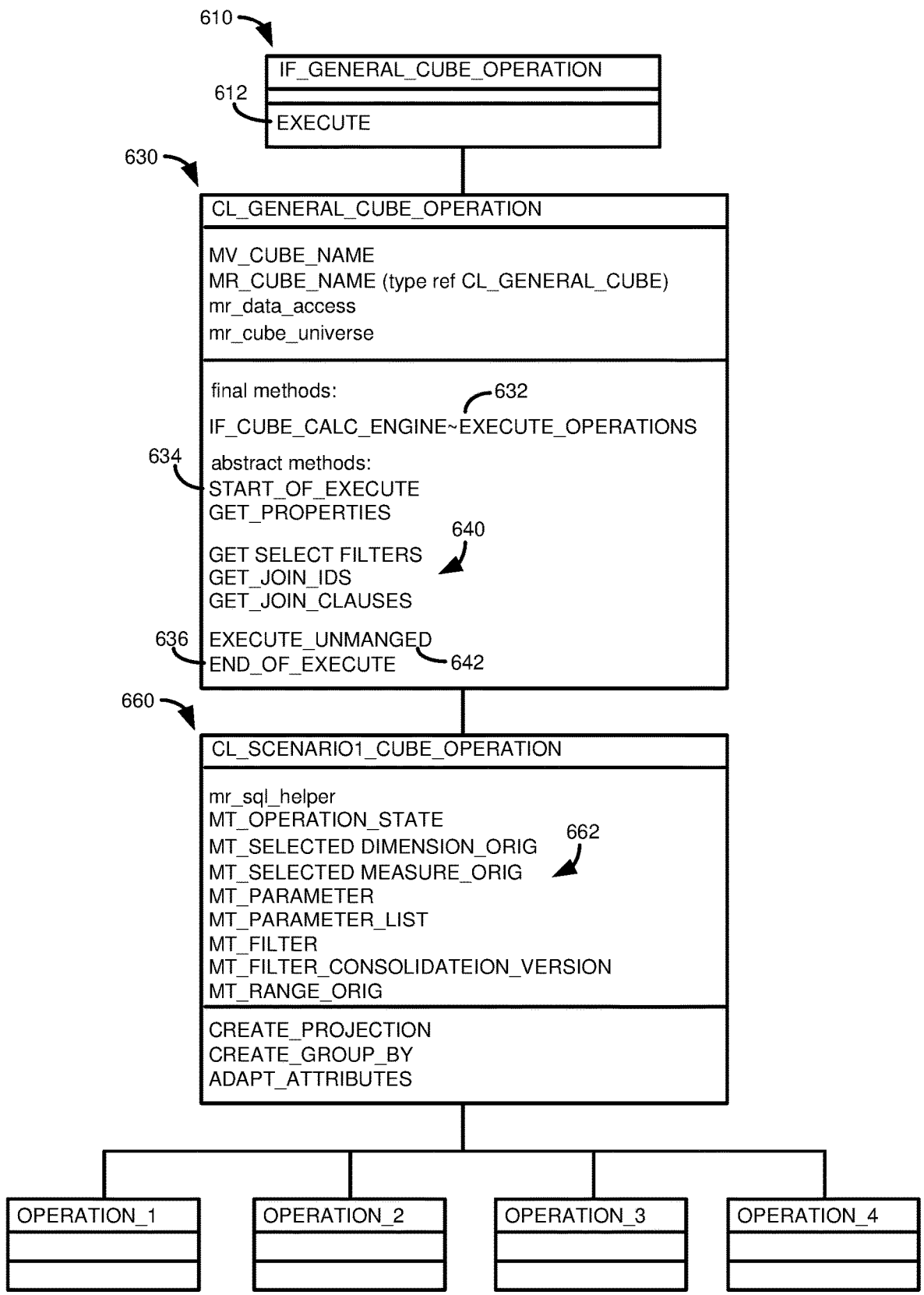

FIGS. 4-6 are example class diagrams for a particular implementation of disclosed technologies. In FIG. 4, a highest-level of a virtual cube framework is a READ interface 410. The READ interface 410 specifies three abstract methods, a "get_properties" method 412, a "read" method 414, and a "define" method 416. The method 412 can retrieve or provide general query execution parameters or conditions, such as what types of query conditions are allowed, or specifying result handling options, such as specifying a data aggregation level or type or determining whether a reduced number of attributes can be used in processing the query (including eliminating attributes that are not used/required for query processing). The method 416 can retrieve query parameters and set them for use in query processing. The method 414 can be an overall execution method that reads data from the database and returns query results. Since the methods 412, 414, 416 are defined in the READ interface 410, their implementation is left to a class or subclass that implements the interface.

FIG. 4 illustrates a scenario with a general cube class 430 that implements the interface 410, and a subclass 460 that is a child of the general cube class. In practice, disclosed techniques need not include any particular arrangement of interfaces, classes, or subclasses. That is, certain aspects of the present disclosure provide techniques that perform queries using an internal table and simpler views instead of using a single complex view/completely in-database processing. Further aspects of the present disclosure provide a framework that includes a virtual cube, a calculation engine, and one or more operations, but the framework need not have any particular class/interface structure or implementation. However, as has been described, having interfaces, classes, and subclasses can facilitate code generation by providing a programming template or pattern that developers can easily take advantage of, reusing/leveraging existing code by making additions/changes to code at a low level of granularity/in a way that allows reuse of existing coding, and simplifying debugging by using a clear development strategy with separable components/functionality.

In any event, in the example shown, the general cube class 430 includes final implementations 432, 434, 436 of the interface methods 412, 414, 416. However, the general cube class 430 defines additional abstract methods to be implemented in the child subclass 460. In particular, the general cube class 430 declares methods 440, 442 for a start and end of a define process (e.g., for the process 432), methods 444, 446 for a start and end of a read process (e.g., 434), a method 448 to call a calculation engine for the cube, and a method 450 to get operations that can be performed/called by the calculation engine. The cube class 430 further includes an implemented method 452 to generate an internal table to be used in query processing.

The subclass 460 can represent a specific cube type, or can represent a sub-genus of the more general cube class 430, where the subclass 460 can have child subclasses that serve as species of the subclass 460. The subclass 460, or one of its child subclasses, implements the methods 440-452, and in some cases can implement methods declared by the interface 410. It can be seen that the subclass 460 includes multiple member variables 464, which can represent particular query parameters or query processing parameters that are used in processing cubes in a particular use case.

The interface 410, general cube class 430, and the cube subclass 460 illustrate how disclosed techniques provide guidance to users in implementing query processing using simpler views. If a use case is envisioned where a cube might need different query parameters or query processing parameters than the subclass 460, a user can view the requirements set forth in the interface 410 and the general cube class 430 to understand how a new subclass should be created, or the subclass 460 modified. If desired, a user can even modify the class 430, or create a new class that implements the interface 410, understanding that any cube class would at least need to implement the methods 412, 414, 416.

FIG. 5 provides a class diagram for a calculation engine class. The diagram is similar to the class structure shown in FIG. 4, in the calculation class hierarchy includes a calculation engine interface 510, a general calculation engine class 530, and a calculation engine subclass 560. The general calculation engine class 530 includes an implementation 532 of an "execute" method 512 of the interface 510. The "execute" method 532 provides a general execution pattern that guides the implementation of the subclass 560. The general calculation class 530 also declares a "next operation" method 534. The method 534 indicates that subclasses, such as the subclass 560, should provide instructions for progressing through operations required for query execution.

FIG. 6 provides a class diagram for a cube operation class, which again contains an interface 610, a general operation class 630, and an operation subclass 660, in a similar manner as described for the cube and calculation engine classes. The interface 610 incudes a general execute method 612 that is implemented by method 632 of the general operation class 630. The general operation class 630 also defines a number of abstract methods to be implemented in the subclass 660, including methods 634, 636 to start and end operation execution. As discussed, in a particular implementation of the disclosed techniques, an operation includes a data retrieval operation from a database and optionally additional processing steps. For operations after a first operation, data in an internal table can be joined with data retrieved as part of a current operation. Methods 640 are provided for filtering data from the internal table as part of a join operation, and for defining the join conditions between the newly retrieved data and data from the internal table. A method 642 can be used to implement any additional processing for the operation.

The subclass 660 includes member variables 662, many of which relate to parameters used in retrieving data from a database.

Example 6—Example Operations in
Augmenting/Integrating Consolidated Data

Figure 7:
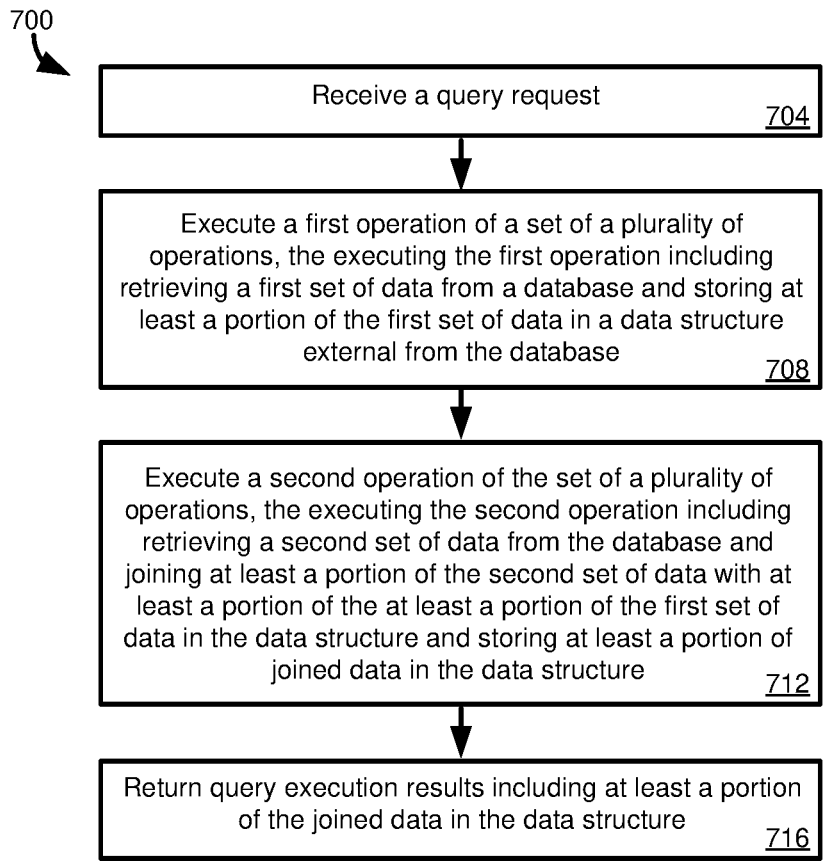
FIG. 7 is a flowchart of example operations in executing a query using a query execution framework.

FIG. 7 is a flowchart of a method 700 for executing a query by joining data retrieved from a database with data previously retrieved from the database, or derived therefrom, and stored in a data structure external from the database. The method 700 can be implemented in the computing environment 200 of FIG. 2, and can represent an embodiment of the method 300 of FIG. 3.

At 704, a query request is received. A first operation of a set of a plurality of operations is executed at 708. The execution of the first operation includes retrieving a first set of data from a database and storing at least a portion of the first set of data in a data structure external from the database. A second operation of the set of a plurality of operations is executed at 712. The execution of the second operation includes retrieving a second set of data from the database and joining at least a portion of the second set of data with at least a portion of the at least a portion of the first set of data in the data structure and storing at least a portion of the joined data in the data structure. At 716, query execution results are returned that include at least a portion of the joined data in the data structure.

Example 7—Computing Systems

Figure 8:
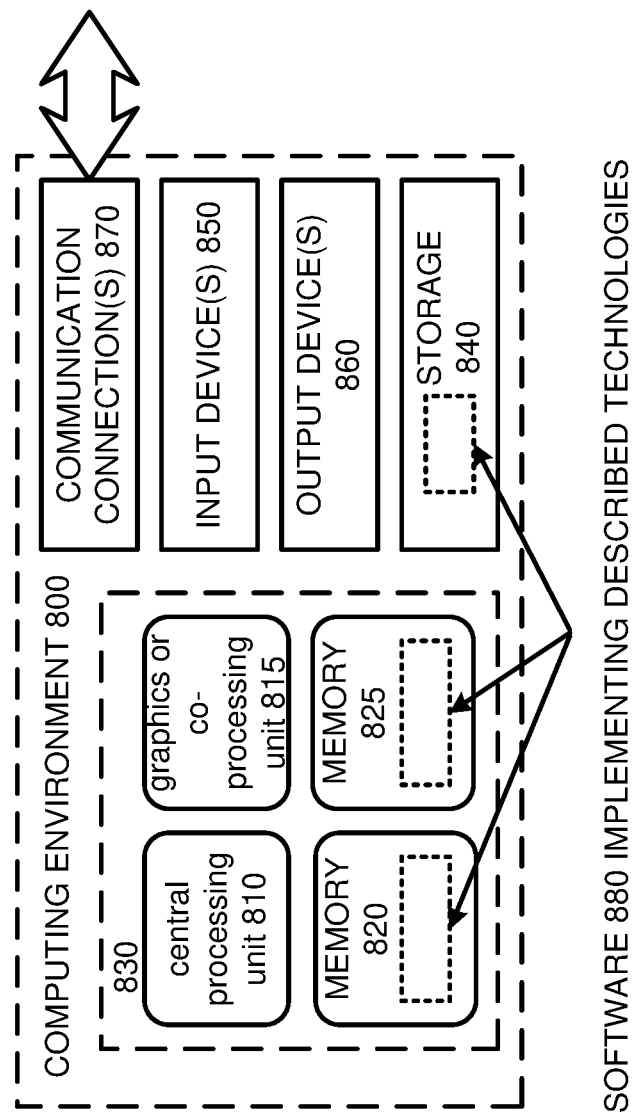
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the technologies described in Examples 1-6. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 9:
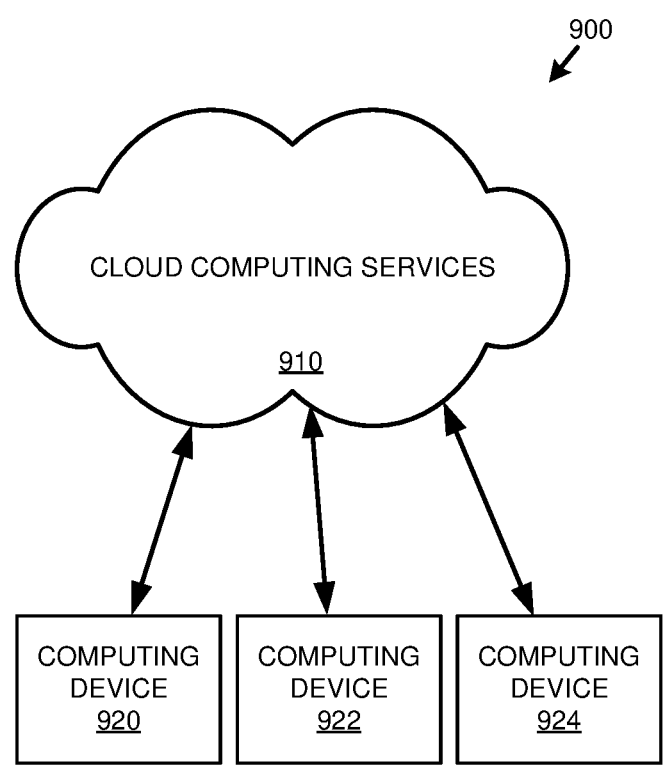
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
at least one hardware processor coupled to the at least one memory; and
one or more computer-readable storage media storing computer-executable instructions that, when executed, cause the computing system to perform operations comprising:
receiving a query request specifying at least one data artifact of a virtual data model, wherein the at least one data artifact of the virtual data model comprises a plurality of instructions that are useable to generate a plurality of database operations that, when executed, retrieve and process data stored in a database;

refactoring at least a portion of the plurality of instructions to provide a plurality of operations, at least a portion of the plurality of operations corresponding to refactored instructions of the plurality of instructions;

executing a first operation of the plurality of operations, the executing the first operation comprising retrieving a first set of data from the database and storing at least a portion of the first set of data in a data structure of the virtual data model, external from the database;

executing a second operation of the plurality of operations, the executing the second operation comprising retrieving a second set of data from the database and joining at least a portion of the second set of data with at least a portion of the at least a portion of the first set of data in the data structure and storing at least a portion of joined data in the data structure external from the database, wherein the second operation corresponds to a refactored version of a first instruction of the plurality of instructions, and wherein the first instruction of the plurality of operations is associated with at least one database operation of the plurality of database operations specified to be performed in the database and the second operation is performed outside of the database using the virtual data model; and returning query execution results comprising data of the at least a portion of the joined data in the data structure or data derived therefrom.

2. The computing system of claim 1, the operations further comprising:

analyzing the at least one data artifact of the virtual data model specified in the query request; and determining that the at least one data artifact of the virtual data model comprises a flag indicating that a query refactoring framework should be used for query execution, where the executing the first operation and the executing the second operation are carried out in response to the determining.

3. The computing system of claim 2, wherein the flag comprises an identifier of virtual data artifact class to be used for query execution.

4. The computing system of claim 2, wherein an instruction of the plurality of instructions of the at least one data artifact of the virtual data model specifies a single data retrieval operation for a database, the single data retrieval operation comprising a first plurality of join operations on a first plurality of data artifacts, and the set of a plurality of operations specifies a plurality of discrete data retrieval operations for the database.

5. The computing system of claim 2, wherein the at least one data artifact of the virtual data model is executable using a first plurality of database artifacts and the set of a plurality of operations are executable using a second plurality of database artifacts, wherein the second plurality of database artifacts comprises fewer database artifacts than the first plurality of database artifacts.

6. The computing system of claim 2, wherein the at least one data artifact specifies a first plurality of joins between a first plurality of database artifacts and the plurality of operations specifies a second plurality of joins between a second plurality of database objects, wherein the second plurality of joins comprises fewer joins than the first plurality of joins.

7. The computing system of claim 2, wherein the data structure is a table and the operations further comprise:

analyzing data elements specified in the at least one data artifact of the virtual data model; and creating columns for the table corresponding to at least a portion of the data elements.

8. The computing system of claim 1, wherein the first and second operations are instances of an operation class and are called for execution by an instance of a calculation engine class.

9. The computing system of claim 8, wherein the operation class and the calculation engine class are called by an instance of a virtual data artifact class.

10. The computing system of claim 9, wherein the virtual data artifact class implements a virtual data artifact read interface.

11. The computing system of claim 10, wherein the virtual data artifact class is a first virtual data artifact class and a second virtual data artifact class, different from the first virtual data artifact class, also implements the virtual data artifact read interface.

12. The computing system of claim 8, wherein the calculation engine class specifies an operation execution loop, wherein the first and second operations are called for execution in the operation execution loop.

13. The computing system of claim 1, the operations further comprising:

analyzing query operations of the query request; and based at least in part on the analyzing query operations of the query request, determining the plurality of operations from a library of operations.

14. The computing system of claim 13, the operations further comprising:

determining an operation execution sequence for operations of the plurality of operations.

15. The computing system of claim 1, wherein a given operation of the plurality of operations comprises at most one select statement for execution on the database.

16. The computing system of claim 1, wherein a given operation of the set of a plurality of operations comprises a single select statement for execution on the database.

17. The computing system of claim 1, wherein the second set of data specifies aggregation parameters for at least a portion of the first set of data.

18. The computing system of claim 1, wherein the executing the first operation further comprises formatting, typing, or providing semantic information for at least a portion of data of the first set of data.

19. A method, implemented in a computing system comprising at least one memory and at least one hardware processor coupled to the at least one memory, the method comprising:

receiving a query request specifying at least one data artifact of a virtual data model, wherein the at least one data artifact of the virtual data model comprises a plurality of instructions that are useable to generate a plurality of database operations that, when executed, retrieve and process data stored in a database;

refactoring at least a portion of the plurality of instructions to provide a plurality of operations, at least a portion of the plurality of operations corresponding to refactored instructions of the plurality of instructions;

executing a first operation of the plurality of operations, the executing the first operation comprising retrieving a first set of data from the database and storing at least a portion of the first set of data in a data structure of the virtual data model, external from the database;

executing a second operation of the plurality of operations, the executing the second operation comprising retrieving a second set of data from the database and joining at least a portion of the second set of data with at least a portion of the at least a portion of the first set of data in the data structure and storing at least a portion of joined data in the data structure external from the database, wherein the second operation corresponds to a refactored version of a first instruction of the plurality of instructions, and wherein the first instruction is associated with at least one database operation of the plurality of database operations specified to be performed in the database and the second operation is performed outside of the database using the virtual data model; and returning query execution results comprising data of the at least a portion of the joined data in the data structure or data derived therefrom.

20. One or more computer-readable storage media comprising:

computer-executable instructions that, when executed by a computing system comprising at least one memory and at least one hardware processor coupled to the at least one memory, cause the computing system to receive a query request specifying at least one data artifact of a virtual data model, wherein the at least one data artifact of the virtual data model comprises a plurality of instructions that are useable to generate a plurality of database operations that, when executed, retrieve and process data stored in a database;

computer-executable instructions that, when executed by the computing system, cause the computing system to refactor at least a portion of the plurality of instructions to provide a plurality of operations, at least a portion of the plurality of operations corresponding to refactored instructions of the plurality of instructions;

computer-executable instructions that, when executed by the computing system, cause the computing system to execute a first operation comprising retrieving a first set of data from the database and storing at least a portion of the first set of data in a data structure of the virtual data model, external from the database;

computer-executable instructions that, when executed by the computing system, cause the computing system to execute a second operation of the plurality of operations, the executing the second operation comprising retrieving a second set of data from the database and joining at least a portion of the second set of data with at least a portion of the at least a portion of the first set of data in the data structure and storing at least a portion of joined data in the data structure external from the database, wherein the second operation corresponds to a refactored version of a first instruction of the plurality of instructions, and wherein the first instruction is associated with at least one database operation of the plurality of database operations specified to be performed in the database and the second operation is performed outside of the database using the virtual data model; and computer-executable instructions that, when executed by the computing system, cause the computing system to return query execution results comprising data of the at least a portion of the joined data in the data structure or data derived therefrom.

\* \* \* \* \*